United States Patent
Kim et al.

(10) Patent No.: US 11,182,056 B2
(45) Date of Patent: Nov. 23, 2021

(54) APPLICATION NAVIGATION

(71) Applicant: salesforce.com, inc., San Francisco, CA (US)

(72) Inventors: Yuseung Kim, San Francisco, CA (US); Behzad Richey, Los Angeles, CA (US); Naga Siva Chandra Prasad Pamidi, San Francisco, CA (US); Juyong Kim, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/884,780

(22) Filed: Jan. 31, 2018

(65) Prior Publication Data
US 2019/0235712 A1    Aug. 1, 2019

(51) Int. Cl.
*G06F 3/0484* (2013.01)
*G06F 3/0482* (2013.01)
*G06F 16/26* (2019.01)
*G06F 16/25* (2019.01)
*G06F 9/451* (2018.01)

(52) U.S. Cl.
CPC .......... *G06F 3/0484* (2013.01); *G06F 3/0482* (2013.01); *G06F 9/451* (2018.02); *G06F 16/252* (2019.01); *G06F 16/26* (2019.01)

(58) Field of Classification Search
CPC ...... G06F 3/0484; G06F 3/0482; G06F 16/26; G06F 16/252; G06F 9/451
See application file for complete search history.

(56) References Cited

U.S. PATENT DOCUMENTS

| | | | | |
|---|---|---|---|---|
| 7,376,900 B2* | 5/2008 | Guido | ................... | G06F 16/958 715/742 |
| 7,636,881 B2* | 12/2009 | Lection | ................. | G06F 16/954 715/205 |
| 8,260,844 B2* | 9/2012 | Timmons | .............. | G06F 16/957 709/203 |
| 8,266,538 B2* | 9/2012 | Chaudhri | ................ | G06F 3/048 715/764 |
| 8,302,020 B2* | 10/2012 | Louch | .................... | B60K 35/00 715/764 |
| 9,262,071 B2* | 2/2016 | Drislane | ............. | G06F 3/04883 |
| 9,400,893 B2* | 7/2016 | Tseng | .................. | G06F 21/6245 |
| 9,842,099 B2* | 12/2017 | Bedard | .................... | G06F 40/18 |
| 10,089,120 B2* | 10/2018 | Baumecker | ........... | G06F 3/0484 |
| 10,366,079 B1* | 7/2019 | Xiao | ..................... | G06F 16/243 |

(Continued)

*Primary Examiner* — Jeremy L Stanley
(74) *Attorney, Agent, or Firm* — Sterne, Kessler, Goldstein & Fox P.L.L.C.

(57) ABSTRACT

Disclosed herein are system, method, and computer program product embodiments for quickly switching between multiple dashboards of an application. An embodiment operates by tracking changes made to a first dashboard of an application. The embodiment receives a selection for a second dashboard of the application. The embodiment stores a first data set and a first data state of the first dashboard in a cache. The embodiment removes the first dashboard from memory. The embodiment loads a second dashboard of the application into memory based on the selection. The embodiment then updates the second dashboard in the memory based on a second data set associated with the second dashboard and the shared data associated with a plurality of dashboards.

21 Claims, 5 Drawing Sheets

(56) References Cited

U.S. PATENT DOCUMENTS

| | | | |
|---|---|---|---|
| 2008/0209078 A1* | 8/2008 | Bates | G06Q 10/00 710/10 |
| 2009/0172518 A1* | 7/2009 | Ogievetsky | G06F 16/972 715/234 |
| 2010/0064374 A1* | 3/2010 | Martin | G16H 40/63 726/27 |
| 2010/0083164 A1* | 4/2010 | Martin | G16H 40/63 715/781 |
| 2013/0167088 A1* | 6/2013 | Mangum | G06F 3/0488 715/815 |
| 2013/0246130 A1* | 9/2013 | Michel | G06F 16/248 705/7.36 |
| 2014/0015846 A1* | 1/2014 | Campbell | G09G 5/391 345/589 |
| 2014/0282046 A1* | 9/2014 | Gonsalves | G06F 11/0709 715/740 |
| 2014/0282053 A1* | 9/2014 | Hauschild | G06F 9/451 715/744 |
| 2014/0379801 A1* | 12/2014 | Gupta | H04L 67/306 709/204 |
| 2015/0020191 A1* | 1/2015 | Vida | G06F 9/451 726/17 |
| 2015/0039942 A1* | 2/2015 | Che | G06F 11/3612 714/38.1 |
| 2015/0153918 A1* | 6/2015 | Chen | G06Q 30/0201 715/771 |
| 2015/0212663 A1* | 7/2015 | Papale | G06F 16/248 715/762 |
| 2015/0242772 A1* | 8/2015 | Backof, II | G06Q 10/0631 705/7.12 |
| 2015/0271032 A1* | 9/2015 | Gingade | G06F 9/452 715/736 |
| 2015/0296040 A1* | 10/2015 | Wang | G06F 16/248 709/213 |
| 2016/0210334 A1* | 7/2016 | Prophete | G06F 3/04847 |
| 2017/0019487 A1* | 1/2017 | Maheshwari | H04L 67/16 |
| 2017/0034300 A1* | 2/2017 | George | H04L 67/32 |
| 2017/0090723 A1* | 3/2017 | Baumecker | G06F 3/0484 |
| 2017/0123397 A1* | 5/2017 | Billi | G06Q 10/063 |
| 2017/0154089 A1* | 6/2017 | Sherman | G06F 16/26 |
| 2017/0214674 A1* | 7/2017 | Bakshi | H04L 63/08 |
| 2017/0214676 A1* | 7/2017 | Bakshi | H04L 67/289 |
| 2017/0286449 A1* | 10/2017 | Strube | G06F 3/0482 |
| 2018/0018364 A1* | 1/2018 | Gupta | G06F 3/04817 |
| 2018/0024701 A1* | 1/2018 | Sanches | G06F 17/2247 715/781 |
| 2018/0060956 A1* | 3/2018 | Felberbaum | G06F 3/0484 |
| 2018/0285246 A1* | 10/2018 | Tuttle | G06F 11/3664 |
| 2018/0287902 A1* | 10/2018 | Chitalia | G06F 11/3006 |
| 2018/0349485 A1* | 12/2018 | Carlisle | G06Q 50/01 |
| 2018/0365312 A1* | 12/2018 | Mansoor | G06Q 10/06316 |
| 2018/0366021 A1* | 12/2018 | Zertuche | G09B 7/02 |
| 2019/0102071 A1* | 4/2019 | Redkina | G06F 16/951 |
| 2019/0102719 A1* | 4/2019 | Singh | H04L 43/045 |
| 2019/0108046 A1* | 4/2019 | Spencer-Harper | G06F 9/451 |
| 2019/0108074 A1* | 4/2019 | Pilkington | G06F 9/543 |

\* cited by examiner

APPLICATION NAVIGATION

BACKGROUND

A software application may consist of one or more dashboards. A dashboard may display various assets in a unified display. For example, a dashboard may display assets representing data objects or applications. Different dashboards may display different assets. For example, one dashboard may display assets representing sales data and another dashboard may display assets representing customer service data.

A user may want to navigate between different dashboards in order to view different data. In other words, the user may want an application navigation mechanism that allows the user to switch between different dashboards. The user may want an application navigation mechanism that provides several benefits. First, the user may want an application navigation mechanism that quickly switches between different dashboards. For example, the user may want an application navigation mechanism that minimizes the amount of time it takes to load and display a different dashboard. Second, the user may want an application navigation mechanism that enables the user to switch to another dashboard without having to close the currently open dashboard. Finally, the user may want an application navigation mechanism that preserves the dashboard state of the currently open dashboard when switching to another dashboard.

Currently, existing application navigation mechanisms that enable switching between different dashboards suffer from several technical problems. First, existing approaches often require the user to close the currently open dashboard before switching to another dashboard. Second, existing approaches may require loading a new copy of a dashboard on top of an existing dashboard when switching between different dashboards. This may increase memory consumption and reduce the number of dashboards that can be switched between. Moreover, loading a new copy of a dashboard may increase load time because it may cause the re-execution of one or more assets of the dashboard. Third, existing approaches may not preserve the state of a previously opened dashboard. This may decrease user satisfaction because the user cannot return to the previously opened dashboard as it existed when they left it.

Thus, what is needed is a way for a software application to enable a user to quickly switch between multiple dashboards.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
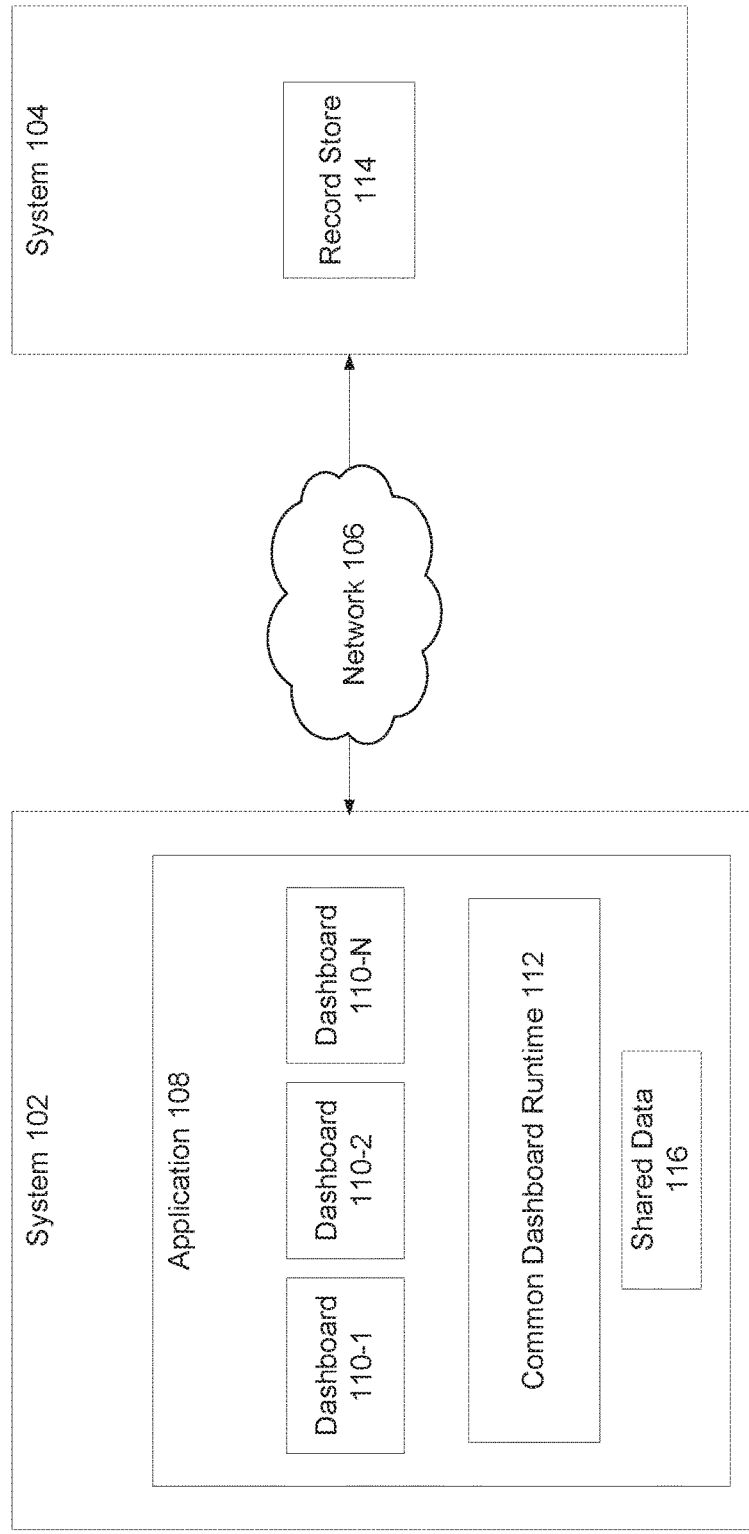
FIG. 1 is a block diagram of a system for quickly switching between multiple dashboards while reducing memory consumption and enabling dashboard state preservation, according to some embodiments.

Provided herein are system, apparatus, device, method and/or computer program product embodiments, and/or combinations and sub-combinations thereof, for quickly switching between multiple dashboards.

In some embodiments, a software application may consist of one or more dashboards. As would be appreciated by a person of ordinary skill in the art, a dashboard may also be referred to as a portal, launch pad, or home screen. A dashboard may display various assets in a unified display. Different dashboards may display different assets.

In some embodiments, an asset may be a data object or application. An asset may represent one or more key metrics or trends of a business, organization, or other type of entity. Because a dashboard may display multiple assets, it allows a user to view multiple key metrics or trends of a business, organization, or other type of entity that are associated with a common theme such as sales performance, customer service, etc.

In some embodiments, a software application may use a stack data structure to enable a user to switch between multiple dashboards. In such an embodiment, when a user opens a dashboard, a copy of the dashboard is stored on the stack data structure. In some embodiments, the software application may load a dashboard runtime on to the stack data structure as part of the copy of the dashboard. The dashboard runtime may display the copy of the dashboard. In some embodiments, the software application may load one or more assets assigned to the dashboard on to the stack data structure as part of the copy of the dashboard. The software application may execute the one or more assets after loading them on to the stack data structure. This may involve executing one or more database queries for the one or more assets.

In some embodiments, the software application may enable a user to switch from a currently opened dashboard to a different dashboard. In some embodiments using a stack data structure, when the user wants to switch to another dashboard, the user may need to first close the currently opened dashboard. The user may then open the other dashboard. But this potentially disrupts user workflow because the user has to leave the currently open dashboard in order to switch to the other dashboard. This may create a disruptive context change for the user.

Moreover, in some embodiments using a stack data structure, when the user switches to another dashboard, the software application may need to load a new copy of the dashboard on to the stack data structure. This may include loading the one or more assets assigned to the dashboard on to the stack data structure, as well as a dashboard runtime that displays the dashboard. This loading may be necessary even if the dashboard being switched to was previously opened.

For example, in some embodiments using a stack data structure, a user may open a dashboard A, then a dashboard B, and then a dashboard C. In other words, the software application may load a copy of dashboard A, a copy of dashboard B, and a copy of dashboard C on to the stack data structure. The user may then want to, for example, switch back to dashboard A from dashboard C. But using a stack data structure to switch back to dashboard A may suffer from several technical problems.

First, if the user wants to switch back to the copy of dashboard A on the stack data structure, the user needs to close dashboard C and dashboard B. In other words, the user needs to remove or "pop" dashboard C and dashboard B from the stack data structure. But removing dashboard C and dashboard B from the stack data structure will remove the dashboard states of dashboard C and dashboard B. The user therefore will not be able to return to the previous states of dashboard C and dashboard B.

Second, if the user wants to switch to dashboard A, but preserve the previous states of dashboard C and dashboard B, the user needs to load a new copy of dashboard A on to the stack data structure. In other words, the software application needs to load a new copy of dashboard A on top of the copy of dashboard C in the stack data structure. But the new copy of dashboard A will not contain the previous state of dashboard A because it is a brand new copy. Moreover, the loading of a new copy of dashboard A will substantially increase memory consumption and therefore limit the number of dashboards that can be switched between. Moreover, the loading of a new copy of dashboard A may increase computation and network requests because the one or more assets of dashboard A may need to be re-executed.

FIG. 1 is a block diagram of a system 100, according to some embodiments. System 100 includes system 102 connected to system 104 via network 106. System 102 enables a user to quickly switch between multiple dashboards while avoiding the memory consumption and dashboard state preservation issues associated with previous application navigation mechanisms. As would be appreciated by a person of ordinary skill in the art, system 102 may be connected to multiple systems 104. In some embodiments, system 102 may be a desktop computer, laptop, tablet, mobile device, wearable electronic device, or other electronic device.

In some embodiments, system 104 may be a server computer, desktop computer, laptop, tablet, mobile device, wearable electronic device, or other electronic device. In some other embodiments, system 104 may be a software platform for cloud computing.

In some embodiments, system 104 may store one or more data objects in record store 114. Record store 114 may be a database or other type of data store. A data object may be an item or collection of data. For example, a data object may be customer sales data or customer service data. As would be appreciated by a person of ordinary skill in the art, a data object may be various other types of data.

In some embodiments, network 106 may be any network or combination of networks including the Internet, a local area network (LAN), a wide area network (WAN), a wireless network, a cellular network, or various other types of networks as would be appreciated by a person of ordinary skill in the art.

In some embodiments, system 102 includes an application 108. For example, application 108 may be a customer relationship management (CRM) application that runs on system 102. In some embodiments, application 108 may be a web application designed to run inside a web browser. In some other embodiments, application 108 may be a software application designed to run on a desktop computer, laptop, tablet, mobile device, wearable electronic device, or other electronic device. As would be appreciated by a person of ordinary skill in the art, application 108 may be another type of software application.

In some embodiments, application 108 may include one or more dashboards 110 and common dashboard runtime 112. In some embodiments, application 108, via common dashboard runtime 112, may load a dashboard 110 into memory in response to a user selection.

In some embodiments, common dashboard runtime 112 may configure and display a selected dashboard 110. In some embodiments, common dashboard runtime 112 may also switch between dashboards 110. In some embodiments, because common dashboard runtime 112 is shared among multiple dashboards 100, each dashboard 110 does not need to store its own dashboard runtime. This reduces memory usage. Moreover, in some embodiments, memory usage is reduced because common dashboard runtime 112 maintains a single dashboard 110 in memory at a time.

In some embodiments, common dashboard runtime 112 may store data shared among dashboards 110 in shared data 116. Because the data is shared among multiple dashboards 110, the amount of memory allocated for switching among multiple dashboards 110 is reduced. For example, application 108 may load a selected dashboard 110 into memory that contains its own dashboard specific data but not data in shared data 116.

In some embodiments, shared data 116 may include definitions of assets assigned to the one or more dashboards 110. For example, in some embodiments, a definition of an asset may include one or more database queries performed by the asset. In some embodiments, shared data 116 may include display definitions assigned to the one or more dashboards 110. For example, in some embodiments, a display definition may describe how to layout assets, a dashboard color scheme, and or a dashboard orientation. In some embodiments, common dashboard runtime 112 may store shared data 116 in memory or a secondary storage (e.g., hard disk drive).

In some embodiments, common dashboard runtime 112 may load one or more assets assigned to a dashboard 110 in response to a user selection of it. For example, in some embodiments, common dashboard runtime 112 may load definitions of the one or more assets from shared data 116.

In some embodiments, common dashboard runtime 112 may load one or more display definitions assigned to a dashboard 110 in response to a user selection of it. In some embodiments, common dashboard runtime 112 may load default display definitions assigned to the selected dashboard 110. In some embodiments, common dashboard runtime 112 may load unique display definitions assigned to the selected dashboard 110. In some embodiments, common dashboard runtime 112 may load the display definitions (e.g., common or unique) from shared data 116.

In some embodiments, common dashboard runtime 112 may execute the one or more assets for the selected dashboard 110. In some embodiments, an asset may be a data object. Thus, in this case, common dashboard runtime 112 may display the data object. In some other embodiments, an asset may be an application that displays data of interest to a user. In some embodiments, the asset may be a web application that queries a record store (e.g., record store 114) and presents the results to a user. For example, the asset may be web application that generates and displays a chart of weekly sales in the selected dashboard 110 from sales data stored in record store 114. In some embodiments, the asset may be an application that queries multiple record stores and summarizes the resulting data from the multiple record stores for display in the selected dashboard 110.

In some embodiments, common dashboard runtime 112 may configure the display of the selected dashboard 110 based on a display definition assigned to it. For example, common dashboard runtime 112 may configure the layout of assets, the color scheme, and or the orientation of the selected dashboard 110 based on the display definition assigned to it.

In some embodiments, common dashboard runtime 112 may allow a user to switch between multiple dashboards 110. For example, common dashboard runtime 112 may enable a user to select a dashboard 110 for display from among multiple dashboards 110. Upon selection, common dashboard runtime 112 may display the selected dashboard 110.

Figure 2:
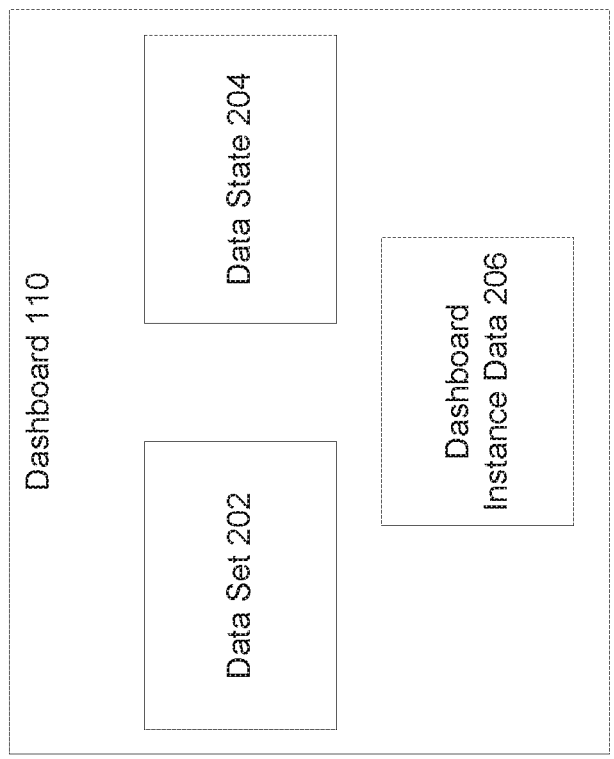
FIG. 2 is a block diagram of a currently selected dashboard of an application, according to some embodiments.

As discussed above, different dashboards 110 may include different assets. For example, application 108 may have a dashboard 110 for analyzing sales data, a dashboard 110 for analyzing customer service data, and a dashboard 110 for analyzing marketing data. In some embodiments, application 108 may provide one or more predefined dashboards 110. A predefined dashboard 110 may include one or more assets and display the one or more assets according to display settings. In some other embodiments, a user may define a custom dashboard 110. In some embodiments, the user may assign one or more assets to the customer dashboard 110. In some embodiments, the user may further configure how the custom dashboard 110 displays the one or more assets by assigning display specifications to the custom dashboard 110, FIG. 2 is a block diagram of a currently selected dashboard 110, according to some embodiments. FIG. 2 is discussed with reference to FIG. 1. Dashboard 110 may include data set 202, data state 204, and dashboard instance data 206.

In some embodiments, data set 202, data state 204, and dashboard instance data 206 may represent data specific to the currently selected dashboard 110. In other words, data set 202, data state 204, and dashboard instance data 206 may represent data that is not shared among multiple dashboards 110 e.g., data that is not stored in shared data 116).

In some embodiments, common dashboard runtime 112 may store the data resulting from the execution one or more assets of the currently selected dashboard 110 in data set 202. For example, common dashboard runtime 112 may store the data resulting from the execution of one or more queries associated with an asset in data set 202. Similarly, common dashboard runtime 112 may store the data generated by an asset (e.g., a generated chart) in the currently selected dashboard 110 in data set 202.

In some embodiments, common dashboard runtime 112 may store data set 202 in a cache. The storage of the data resulting from the execution one or more assets of the currently selected dashboard 110 in data set 202 may reduce network requests when switching back to the currently selected dashboard 110 because the data does not need to be requested or generated again. Similarly, the storage of data generated by an asset in data set 202 may eliminate computation because the data can be retrieved from data set 202 instead of regenerated again.

In some embodiments, common dashboard runtime 112 may track changes to the currently selected dashboard 110. For example, common dashboard runtime 112 may track when a user changes the layout of the currently selected dashboard 110 or the color scheme of the currently selected dashboard 110. In some embodiments, common dashboard runtime 112 may store these changes in data state 204. In some embodiments, common dashboard runtime 112 may store data state 204 in a cache.

In some embodiments, common dashboard runtime 112 may represent the currently instantiated assets (e.g., the assets loaded into memory) and the applied layout, orientation, and color scheme of the currently selected dashboard 110 as dashboard instance data 206. Thus, dashboard instance data 206 may represent data that defines an instance of the currently selected dashboard 110. Dashboard instance data 206 may represent data outside of data set 202 and data state 206 that can be regenerated from shared data 116 by common dashboard 112.

In some embodiments, dashboard instance data 206 may exist while the currently selected dashboard 110 is being displayed. For example, in some embodiments, dashboard instance data 206 is stored in memory while the currently selected dashboard 110 is being displayed. In some embodiments, when a user selects a different dashboard 110 dashboard instance data 206 may be removed from memory.

Figure 3:
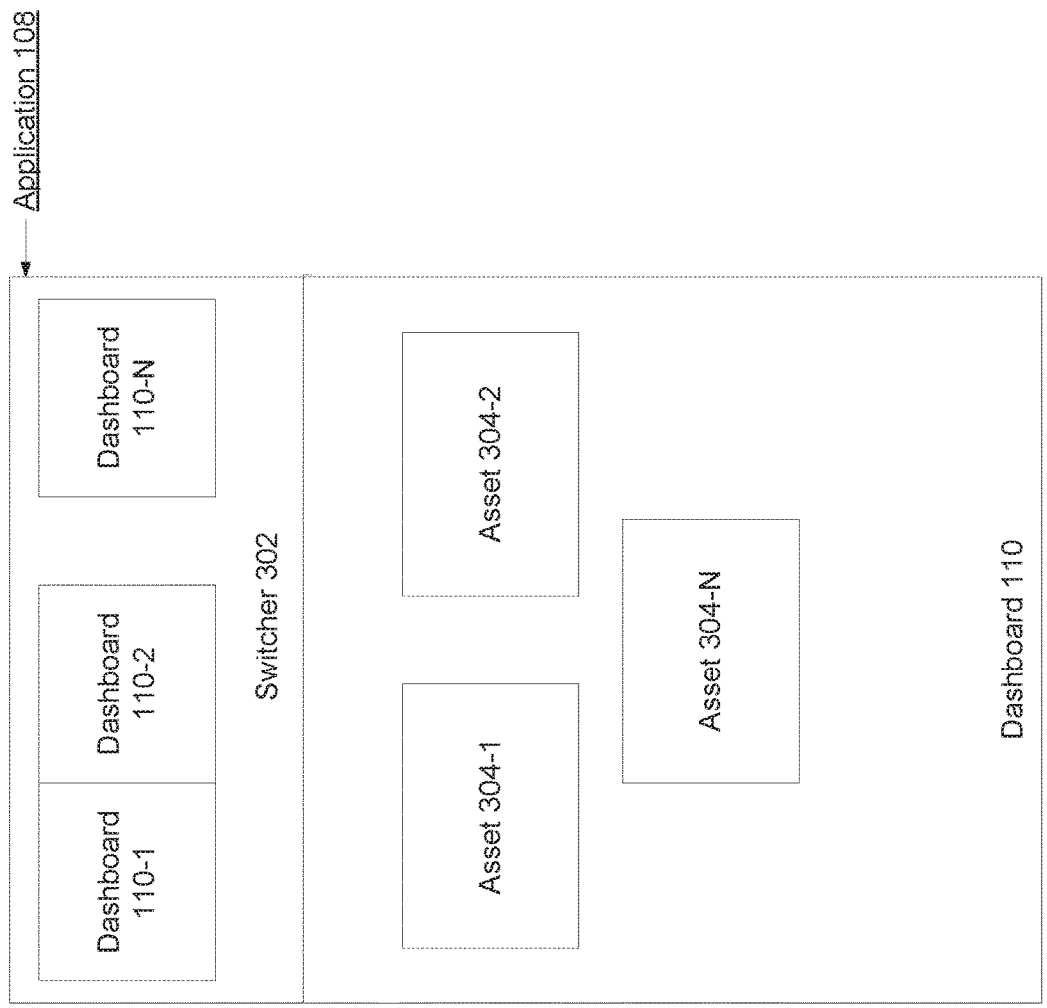
FIG. 3 is a block diagram of a currently selected dashboard being displayed in an application, according to some embodiments.

FIG. 3 is an example block diagram of a currently selected dashboard 110 being displayed in application 108, according to some embodiments. FIG. 3 is discussed with reference to FIGS. 1 and 2.

In some embodiments, common dashboard runtime 112 may configure and display currently selected dashboard 110. In some embodiments, during a first time selection, common dashboard runtime 112 may load and execute one or more assets 304 assigned to the currently selected dashboard 110. In some embodiments, common dashboard runtime 112 may determine which assets 304 are assigned to the currently selected dashboard 110 by checking shared data 116. In some embodiments, where an asset 304 is an application, common dashboard runtime 112 may load the asset 304 by retrieving its definition from shared data 116. In some embodiments, where an asset 304 is a data object, common dashboard runtime 112 may load the asset 304 by retrieving its associated data object from shared data 116. In some embodiments, common dashboard runtime 112 may store the loaded assets 304 in dashboard instance data 206.

In some embodiments, common dashboard runtime 112 may execute a loaded asset 304 by executing its associated definition (e.g., one or more queries defined for the loaded asset 304). In some embodiments, this may cause common dashboard runtime 112 to retrieve data in a record store in an external system (e.g., record store 114 in system 104). In some embodiments, this may cause common dashboard runtime 112 to generate data based on the definition of the asset 304. Common dashboard runtime 112 may display the retrieved or generated data in the currently selected dashboard 110. In some embodiments, common dashboard runtime 112 may store the retrieved or generated data in data set 202.

In some embodiments, common dashboard runtime 112 may configure the look and feel of the currently selected dashboard 110 by applying a common display setting (e.g., layout, color scheme, orientation, etc.) in shared data 116. In some embodiments, common dashboard runtime 112 may configure the look and feel of the selected dashboard 110 by loading and applying a display setting specific to the currently selected dashboard 110. For example, common dashboard runtime 112 may load a display setting defining a dashboard layout, orientation, or color scheme specific to the currently selected dashboard 110.

In some embodiments, a user may want to switch to a different dashboard 110. In some embodiments, a user may switch to a different dashboard 110 by activating switcher 302. In some embodiments, a user may activate switcher 302 by using a user input gesture (e.g., swiping down from the top of the screen with their finger). In some other embodiments, a user may activate switcher 302 by clicking a user interface element in the selected dashboard 110. As would be appreciated by a person of ordinary skill in the art, a user may activate switcher 302 using various other mechanisms.

In some embodiments, switcher 302 may display a collection dashboards 110 that the user can switch between. In some embodiments, the collection may include dashboards 110 that have been previously opened, or never opened. In some embodiments, switcher 302 may be a header that overlays a portion of the currently selected dashboard 110. This may enable a user to simultaneously see the currently selected dashboard 110 when switching. Because switcher 302 can be activated while within the currently selected dashboard 110, a user can navigate to another dashboard 110 without having to first close the currently selected dashboard 110. This may improve user experience because there may not be a dramatic context change when switching between dashboards 110.

In some embodiments, switcher 302 may be a header that displays a collection of dashboards 110 that the user can switch between in a scrollable fashion. This works well for a large number of dashboards 110, including those with long names.

In some embodiments, a user may switch to another dashboard 110 by selecting the new dashboard 110 in switcher 302 (e.g., clicking, tapping, etc.) In some embodiments, upon selection of the new dashboard 110, common dashboard runtime 112 may store data set 202 and data state 204 in a cache. In some embodiments, common dashboard runtime 112 may then remove dashboard instance data 206 from memory. Thus, by removing dashboard instance data 206 from memory, there may be a single instance of it in memory at a time.

In some embodiments, common dashboard runtime 112 may load the newly selected dashboard 110 into memory in response to a user selection in switcher 302. In some embodiments, common dashboard runtime 112 may load the newly selected dashboard 110 into memory as discussed above for a first time load of a dashboard 110.

In some other embodiments, common dashboard runtime 112 may load a previously opened dashboard 110 in response to a user selection in switcher 302. In this case, common dashboard runtime 112 may load and display the previously opened dashboard 110 based on shared data 116 as well as data state 202 and data state 204 of the previously opened dashboard 110. This may restore the previously opened dashboard 110 to its previous dashboard state.

In some embodiments, common dashboard runtime 112 may load the data set 202 associated with the previously opened dashboard 110 from a cache. Common dashboard runtime 112 may then apply the data in the data set 202 to the previously opened dashboard 110. This may restore the previously opened dashboard 110 to its previous dashboard state while avoiding re-executing the one or more assets associated with the previously opened dashboard 110 that generate the data in data set 202. Accordingly, this may reduce network requests and or computations.

In some embodiments, common dashboard runtime 112 may also load data state 204 from the cache. Common dashboard runtime 112 may then apply the data within data state 204 to the previously opened dashboard 110. This may restore the changes made by the user to the previously opened dashboard 110 when they were interacting with it.

Figure 4:
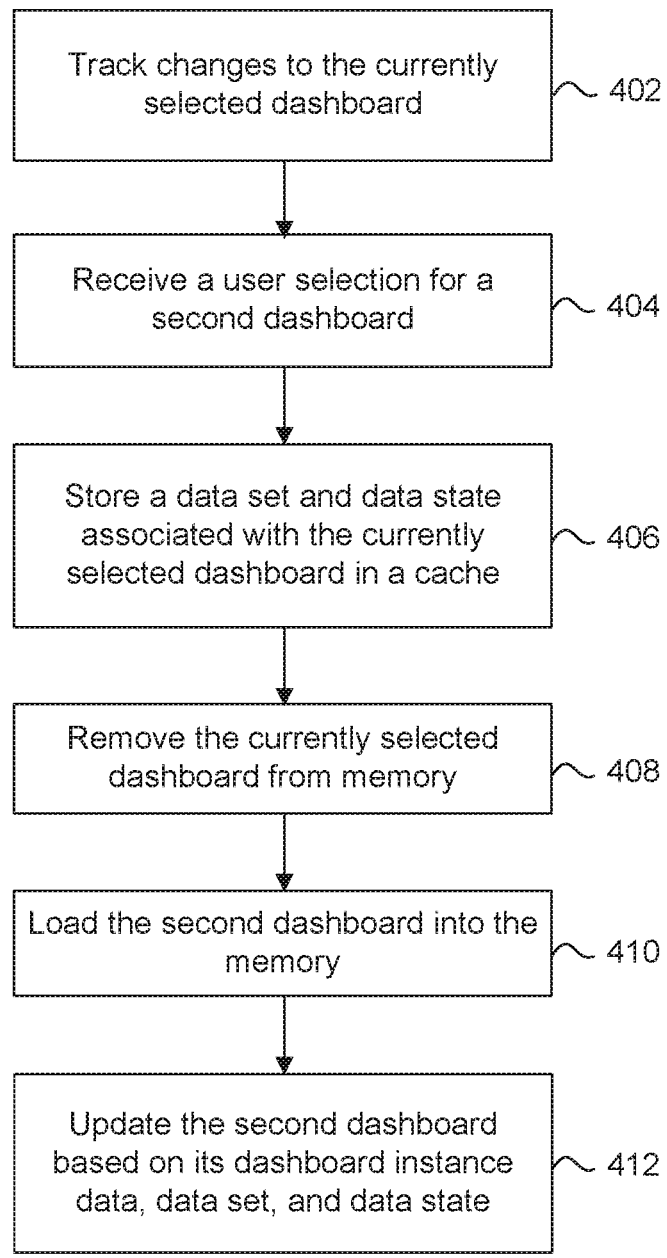
FIG. 4 is a flowchart illustrating a process for quickly switching between multiple dashboards, according to some embodiments.

FIG. 4 is a flowchart for a method 400 for quickly switching between multiple dashboards, according to an embodiment. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to that example embodiment. The steps of method 400 may be performed by application 108. However, as would be appreciated by a person of ordinary skill, method 400 may be performed by common dashboard runtime 112, or a combination of application 108 and common dashboard runtime 112.

In 402, application 108 tracks changes to the currently selected dashboard 110. In some embodiments, the changes represent changes made to shared data 116. In some embodiments, application 108 stores the tracked changes in a data state 204 associated with the currently selected dashboard 110.

In 404, application 108 receives a user selection for a second dashboard 110. In some embodiments, application 108 receives the user selection via switcher 302.

In 406, application 108 stores a data set 202 associated with currently selected dashboard 110, and the data state 204 associated with the currently selected dashboard 110, in a cache in response to receiving the user selection for the second dashboard 110. In some embodiments, the data set 202 associated with currently selected dashboard 110 includes data retrieved or generated by one or more assets associated with the currently selected dashboard 110.

In 408, application 108 removes the currently selected dashboard 110 from memory in response to receiving the user selection for the second dashboard 110. For example, application 108 removes dashboard instance data 206 associated with the currently selected dashboard 110 from memory.

In 410, application 108 loads the second dashboard 110 into memory in response to receiving the user selection for the second dashboard 110. In some embodiments, application 108 loads the one or more assets assigned to the second dashboard 110 into dashboard instance data 206 from shared data 116. In some embodiments, application 108 loads one or more display definitions assigned to the second dashboard 110 into dashboard instance data 206 from shared data 116. In some embodiments, application 108 loads from the cache the data set 204 associated with the second dashboard 110. In some embodiments, application 108 loads from the cache the data state 204 associated with the second dashboard 110.

In 410, application 108 updates the second dashboard 110. In some embodiments, application 108 applies to second dashboard 110 the dashboard instance data 206, the data set 202, and the data state 204 associated with the second dashboard 110. As a result, application 108 displays the second dashboard 110 as it existed prior to switching away from it.

Figure 5:
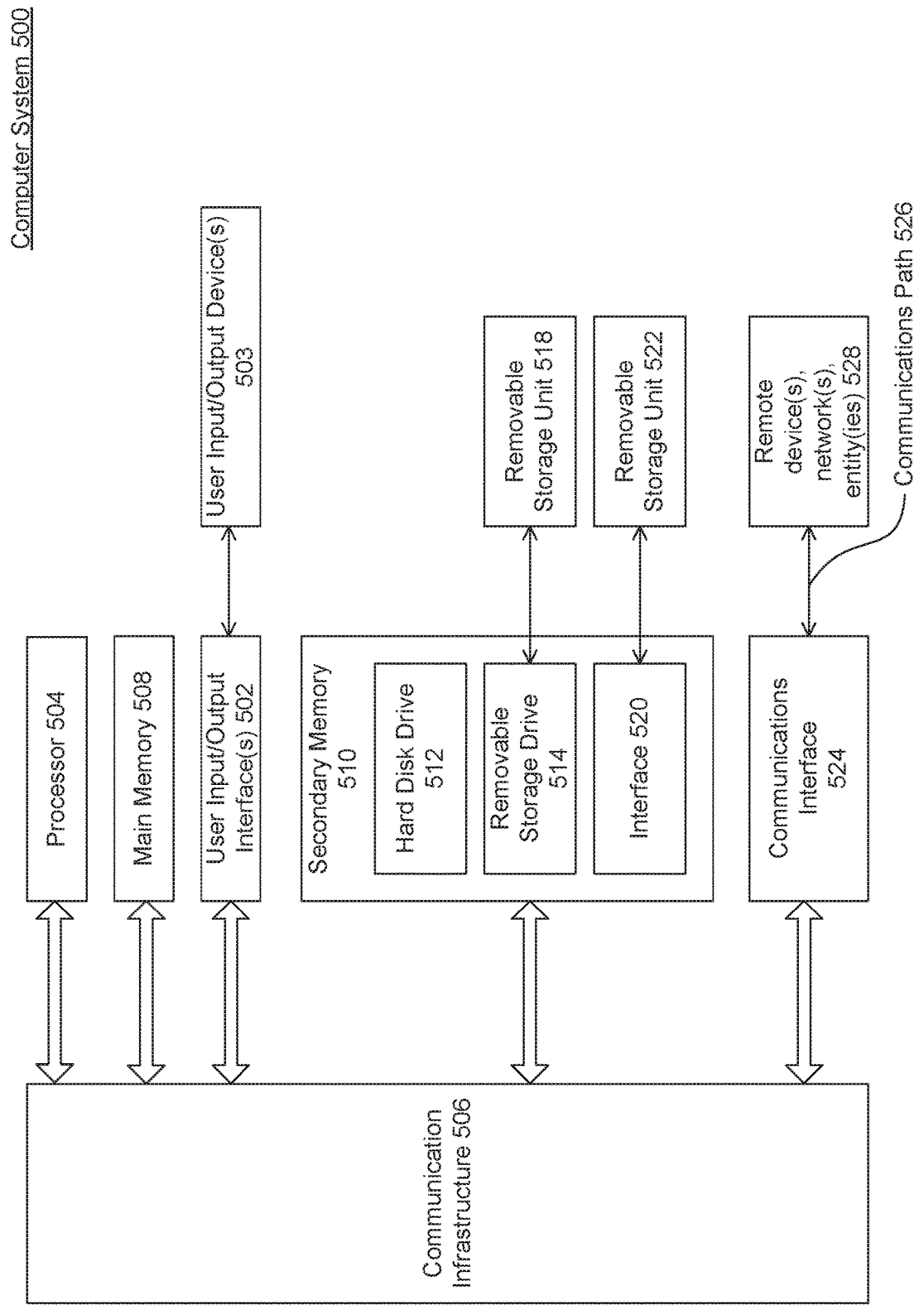
FIG. 5 is an example computer system useful for implementing various embodiments.

Various embodiments can be implemented, for example, using one or more computer systems, such as computer system 500 shown in FIG. 5. Computer system 500 can be used, for example, to implement method 400 of FIG. 4. For example, computer system 500 can perform loading a second dashboard 110 into memory in response to receiving the user selection for the second dashboard 110. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via, communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   loading, by a common dashboard runtime of an application, an asset for a first dashboard of the application from a shared data into a first dashboard instance data in a memory, wherein the asset comprises an application that queries a record store in an external system, the first dashboard instance data is associated with the first dashboard, the application comprises a plurality of dashboards, and the shared data is shared with the plurality of dashboards;
   executing, by the common dashboard runtime of the application, the application of the asset for the first dashboard thereby generating data resulting from one or more queries associated with the asset;
   storing, by the common dashboard runtime of the application, the data resulting from the one or more queries associated with the asset in a data set in the memory, wherein the data is associated with the first dashboard;
   tracking one or more changes made to the first dashboard of the application in the memory, wherein the one or more changes are stored in a data state in the first dashboard;
   storing, by the common dashboard runtime of the application, the data set and the data state in a cache in response to a first selection of a second dashboard;
   removing, by the common dashboard runtime of the application, the first dashboard instance data comprising the asset and the data set from the memory in response to the first selection of the second dashboard;
   loading, by the common dashboard runtime of the application, the second dashboard of the application into the memory in response to the first selection of the second dashboard;
   determining, by the common dashboard runtime of the application, the first dashboard was previously opened in response to a second selection for the first dashboard of the application; and
   loading, by the common dashboard runtime of the application, the data resulting from the one or more queries associated with the asset from the data set in the cache into a second dashboard instance data in the memory based on determining the first dashboard was previously opened, wherein the second dashboard instance data is associated with the first dashboard.

2. The method of claim 1, further comprising:
   receiving the first selection of the second dashboard of the application at a switcher, wherein the switcher displays the plurality of dashboards in a header that overlays a portion of the application.

3. The method of claim 1, the loading the second dashboard further comprising:
   loading a second asset and a display definition associated with the second dashboard into the memory from the shared data.

4. The method of claim 1, further comprising:
   in response to the first selection of the second dashboard, determining the second dashboard was previously opened.

5. The method of claim 4, the loading the second dashboard further comprising:
   loading a second data set associated with the second dashboard into the memory from the cache, wherein the second data set comprises second data generated by a second asset associated with the second dashboard; and
   loading a second data state associated with the second dashboard into the memory from the cache, wherein the second data state comprises changes made to the second dashboard.

6. The method of claim 5, further comprising:
   applying the second data set and the second data state to the second dashboard.

7. The method of claim 5, wherein the second data state comprises a change to a layout associated with the second dashboard, a change to the second asset being displayed by the second dashboard, or a change to a color scheme associated with the second dashboard.

8. The method of claim 1, wherein the one or more changes comprise one or more changes to a layout or a color scheme of the first dashboard.

9. The method of claim 1, further comprising:
   prior to the loading of the data resulting from the one or more queries associated with the asset from the data set into the second dashboard instance data, accessing, by the common dashboard runtime of the application, the data set from the cache to reduce network requests to re-execute the application of the asset for the first dashboard when switching in between dashboards in the plurality of dashboards.

10. A system, comprising:
    a memory; and
    at least one processor coupled to the memory and configured to:
       load, by a common dashboard runtime of an application, an asset for a first dashboard of the application from a shared data into a first dashboard instance data in the memory, wherein the asset comprises an application that queries a record store in an external system, the first dashboard instance data is associated with the first dashboard, the application comprises a plurality of dashboards, and the shared data is shared with the plurality of dashboards;
       execute, by the common dashboard runtime of the application, the application of the asset for the first dashboard thereby generating data resulting from one or more queries associated with the asset;
       store, by the common dashboard runtime of the application, the data resulting from the one or more queries associated with the asset in a data set in the memory, wherein the data is associated with the first dashboard;
       tracking one or more changes made to the first dashboard of the application in the memory, wherein the one or more changes are stored in a data state in the first dashboard;
       store, by the common dashboard runtime of the application, the data set and the data state in a cache in response to a first selection of a second dashboard;
       remove the first dashboard instance data comprising the asset and the data set from the memory based at least in part on the first selection of the second dashboard;
       load, by the common dashboard runtime of the application, the second dashboard of the application into the memory in response to the first selection of the second dashboard;
       determine, by the common dashboard runtime of the application, the first dashboard was previously opened in response to a second selection for the first dashboard of the application; and load, by the common dashboard runtime of the application, the data resulting from the one or more queries associated with the asset from the data set in the cache into a second dashboard instance data in the memory based on determining the first dashboard was previously opened, wherein the second dashboard instance data is associated with the first dashboard.

11. The system of claim 10, wherein the at least one processor is further configured to:
receive the first selection of the second dashboard of the application at a switcher, wherein the switcher displays the plurality of dashboards in a header that overlays a portion of the application.

12. The system of claim 10, wherein to load the second dashboard, the at least one processor is further configured to:
load a second asset and a display definition associated with the second dashboard into the memory from the shared data.

13. The system of claim 10, wherein to load the second dashboard, the at least one processor is further configured to:
in response to the first selection of the second dashboard determine the second dashboard was previously opened;
load a second data set associated with the second dashboard into the memory from the cache, wherein the second data set comprises second data generated by a second asset associated with the second dashboard; and
load a second data state associated with the second dashboard into the memory from the cache, wherein the second data state comprises changes made to the second dashboard.

14. The system of claim 13, wherein the at least one processor further configured to:
apply the second data set and the second data state to the second dashboard.

15. The system of claim 10, wherein the one or more changes comprise one or more changes to a layout or a color scheme of the first dashboard.

16. A non-transitory computer-readable medium having instructions stored thereon that, when executed by at least one computing device, causes the at least one computing device to perform operations comprising:
loading, by a common dashboard runtime of an application, an asset for a first dashboard of the application from a shared data into a first dashboard instance data in a memory, wherein the asset comprises an application that queries a record store in an external system, the first dashboard instance data is associated with the first dashboard, the application comprises a plurality of dashboards, and the shared data is shared with the plurality of dashboards;
executing, by the common dashboard runtime of the application, the application of the asset for the first dashboard thereby generating data resulting from one or more queries associated with the asset;
storing, by the common dashboard runtime of the application, the data resulting from the one or more queries associated with the asset in a data set in the memory, wherein the data is associated with the first dashboard;
tracking one or more changes made to the first dashboard of the application in the memory, wherein the one or more changes are stored in a data state in the first dashboard;
storing, by the common dashboard runtime of the application, the data set and the data state in a cache in response to a first selection of a second dashboard;
removing, by the common dashboard runtime of the application, the first dashboard instance data comprising the asset and the data set from the memory in response to the first selection of the second dashboard;
loading, by the common dashboard runtime of the application, the second dashboard of the application into the memory in response to the first selection of the second dashboard;
determining, by the common dashboard runtime of the application, the first dashboard was previously opened in response to a second selection for the first dashboard of the application; and
loading, by the common dashboard runtime of the application, the data resulting from the one or more queries associated with the asset from the data set in the cache into a second dashboard instance data in the memory based on determining the first dashboard was previously opened, wherein the second dashboard instance data is associated with the first dashboard.

17. The non-transitory computer-readable medium of claim 16, the operations further comprising:
receiving the first selection of the second dashboard of the application at a switcher, wherein the switcher displays the plurality of dashboards in a header that overlays a portion of the application.

18. The non-transitory computer-readable medium of claim 16, the loading comprising:
loading a second asset and a display definition associated with the second dashboard into the memory from the shared data associated with the plurality of dashboards.

19. The non-transitory computer-readable medium of claim 16, the operations further comprising:
in response to the first selection of the second dashboard, determining the second dashboard was previously opened.

20. The non-transitory computer-readable medium of claim 19, the loading the second dashboard comprising:
loading a second data set associated with the second dashboard into the memory from the cache, wherein the second data set comprises second data generated by a second asset associated with the second dashboard;
loading a second data state associated with the second dashboard into the memory from the cache, wherein the second data state comprises changes made to the second dashboard; and
applying the second data set and the second data state to the second dashboard.

21. The non-transitory computer-readable medium of claim 16, wherein the one or more changes comprise one or more changes to a layout or a color scheme of the first dashboard.

* * * * *